United States Patent Office 2,970,952
Patented Feb. 7, 1961

---

2,970,952

CHLORINATION OF SATURATED HYDROCARBONS

Hendrik Kloosterziel, Amsterdam, Netherlands, assignor to Shell Oil Company, a corporation of Delaware No Drawing. Filed Sept. 17, 1959, Ser. No. 840,513

1 Claim. (Cl. 204—163)

---

This invention relates to an improved process for the chlorination of saturated organic compounds, particularly alkanes and cycloalkanes, and partially halogenated alkanes and cycloalkanes.

Organic compounds having a chlorine atom directly bonded to a tertiary or a secondary carbon atom are of interest for a variety of purposes, so that there is a substantial need for a process which will effectively prepare such compounds.

It is well known that chlorine ($Cl_2$) can be used to chlorinate saturated hydrocarbons, and partially halogenated saturated hydrocarbons, by irradiating with actinic light a mixture of chlorine and the hydrocarbon material to be chlorinated. However, chlorine itself has proven to be a very unselective chlorinating agent. That is, when chlorine itself is used as the chlorinating agent, hydrogen bonded to a primary carbon atom will be replaced with chlorine to about the same extent as is hydrogen bonded to a tertiary or secondary carbon atom. Thus, when a saturated hydrocarbon, such as an alkane, containing at least one primary carbon atom and at least one carbon atom which is of secondary or tertiary configuration, is photochlorinated with chlorine, the product contains a very substantial amount of the primary chloride. In fact, in many cases, the major product is the primary chloride. Thus, for example, the product of the photochemical chlorination of 2,3-dimethylbutane by chlorine contains about 60% primary chloride, and but about 40% of tertiary chloride. Chlorine itself thus is not a suitable chlorinating agent for the production of tertiary chlorides.

I now have discovered that perchloromethylmercaptan—equivalently, trichloromethylsulfenyl chloride, $Cl_3CSCl$—is a highly efficient chlorinating agent which is highly selective for the chlorination of secondary and tertiary carbon atoms of saturated hydrocarbons. Considering the example just given—chlorination of 2,3-dimethylbutane—I have found that the product of the photochemical chlorination of 2,3-dimethylbutane with perchloromethylmercaptan contains about 95% tertiary chloride, and but about 5% primary chloride. Perchloromethylmercaptan thus is more than 28 times as selective as chlorine for the chlorination of the tertiary carbon atom of 2,3-dimethylbutane. Further confirmation of this selectivity is shown by the fact that when isopentane is chlorinated by means of perchloromethylmercaptan, 64% of the product is the tertiary chloride, 31% of the product is the secondary chloride, while but 5% of the product is primary chloride.

Further, I have found that perchloromethylmercaptan is a highly efficient chlorinating agent, resulting in conversions of the order of 95% or greater, to give yields of chlorinated products of 95% or greater. Thus, I have found that when perchloromethylmercaptan is used to chlorinate such compounds as cyclohexane, cyclopentane, 2,3-dimethylbutane, n-pentane, n-octane and isopentane, usually about 95% or more of the chlorine in the perchloromethylmercaptan is found in the halogenated hydrocarbon product. Substantially no decomposition product of the mercaptan is formed, the reaction progressing substantially quantitatively according to the equation:

$$RH + Cl_3CSCl = RCl + HCl + Cl_3CSSCCl_3$$

The chlorination is effected simply by mixing the perchloromethylmercaptan and the material to be chlorinated and then exposing the mixture to actinic radiation while maintaining the mixture at a suitable temperature. The chlorinated material then is easily recovered by usual techniques, such as distillation, extraction, or the like, distillation usually being most convenient. The amount of chlorination which occurs will of course depend upon the amount of the chlorinating agent used—the available chlorine being transferred substantially quantitatively from the chlorinating agent to the material to be chlorinated. Where a hydrocarbon is the material used, and the amount of chlorinating agent used is equal to or less than the amount theoretically required to replace one hydrogen atom of the hydrocarbon with chlorine, the chlorinated product is predominantly the monochloride, with but traces—usually of the order of about 1 or 2%—of polyhalides. Where a halogen-substituted hydrocarbon is used, or the amount of chlorinating agent used is in excess of that theoretically required to replace but one hydrogen with chlorine, polychlorides are obtained, the predominant product being that containing one more chlorine atom than the starting material used. For example, I have found that when 1-chlorobutane is photochemically chlorinated with perchloromethylmercaptan, the product contains 4.7% 1,1-dichloride, 21.5% 1,2-dichloride, 63.5% 1,3-dichloride and 10.3% 1,4-dichloride. Chlorination of 1-chloropropane by this method results in 19.3% 1,1-dichloride, 71.2% 1,2-dichloride and 9.5% 1,3-dichloride.

The temperature used will depend upon the reactivity of hydrocarbon or halohydrocarbon reactant used. In many cases, ordinary room temperatures will be quite suitable, while in other cases the reaction is most effectively carried out at temperatures of about 0° C., or even lower—for example, at temperatures as low as about −25° C.—while in other cases, some heating may be desirable to complete the reaction, and temperatures of up to about 50° C. may be found to be required.

It also is known in the art that the presence of an aromatic compound in the reaction mixture markedly increases the selectivity of chlorine per se ($Cl_2$) as a chlorinating agent for tertiary carbon atoms, relative to primary carbon atoms, the selectivity (also designated as relative reactivity) increasing with the concentration of the aromatic compound in the reaction mixture. [Russell, 79 Journal of the American Chemical Society, 2977 (1957).] I have found that this effect also exists with respect to the use of perchloromethylmercaptan as chlorinating agent, so that in some cases, it may be found to be desirable to include an aromatic compound in the reaction mixture to further increase the chlorination of secondary and/or tertiary carbon atoms and to further decrease the chlorination of primary carbon atoms.

I have found that perchloromethylmercaptan has one further advantage as a chlorinating agent. As has already been pointed out herein, in the course of the chlorination, the perchloromethylmercaptan is converted to hexachlorodimethyldisulfide. I have found that this disulfide readily reacts with chlorine to yield perchloromethylmercaptan. All that is necessary to effect the reaction is to mix the disulfide with chlorine, preferably in the presence of a suitable inert solvent, such as carbon tetrachloride. The reaction is conveniently conducted at room temperature. Thus, my new chlorinating agent is easily regenerated, and there is no significant amount of it lost. The only significant by-product of the use of my new chlorinating agent is hydrogen chloride, which itself is a valuable item of commerce.

Following this discovery, I attempted to use perchloromethylmercaptan as simply a catalyst for photochemical chlorination with chlorine itself. I found, however, that the chlorine per se reacts with hydrogen bonded to a primary carbon atom at a sufficiently rapid rate that a very substantial amount of primary chloride is formed, and thus much selectivity is lost. However, I have also found that the reaction of chlorine with hexachlorodimethyldisulfide proceeds in the dark, so that it is possible to conduct chlorination in a staged reaction system wherein the perchloromethylmercaptan is formed in situ. Thus, after the first reaction between the perchloromethylmercaptan and the material to be chlorinated is complete (in actinic radiation), the radiation source is removed, and chlorine added, then the mixture is irradiated to effect chlorination, the radiation source is removed and chlorine added, and this procedure repeated as desired.

My work with perchloromethylmercaptan has shown that it, like chlorine per se, is a general chlorinating agent for saturated organic compounds having what is essentially a hydrocarbon structure. That is, perchloromethylmercaptan, like chlorine per se, under the effect of actinic radiation, will react with any saturated material having a basically carbon-to-carbon structure and which has at least one hydrogen atom bonded to a carbon atom. The most widely known compounds of this class are, of course, the paraffinic hydrocarbons, chiefly the alkanes and alkanes which may be substituted by saturated hydrocarbon structures, such as cycloalkyl groups, or the like, cycloalkanes, and alkanes and cycloalkanes which are partially halogenated. The partially halogenated alkanes and cycloalkanes most widely available are those wherein the halogen atom or atoms is or are one or both of chlorine and bromine, although those wherein the halogen atom or atoms is or are one or both of fluorine and iodine.

I claim as my invention:

In a process for the chlorination of a member of the group consisting of saturated hydrocarbons and partially halogenated saturated hydrocarbons by subjecting said member simultaneously to the action of a chlorinating agent and actinic light, the improvement which comprises employing perchloromethylmercaptan as the chlorinating agent.

References Cited in the file of this patent

Ellis et al.: The Chemical Action of Ultraviolet Rays (1941), pp. 526–533.